(12) United States Patent
Hatchman et al.

(10) Patent No.: US 10,174,596 B2
(45) Date of Patent: Jan. 8, 2019

(54) SURFACTANT COMPOSITION

(71) Applicant: RHODIA OPERATIONS, Paris (FR)

(72) Inventors: Kevan Hatchman, West Midlands (GB); Gareth Collins, West Midlands (GB); Chris Jones, Staffordshire (GB)

(73) Assignee: RHODIA OPERATIONS, Paris (FR)

( * ) Notice: Subject to any disclaimer, the term of this patent is extended or adjusted under 35 U.S.C. 154(b) by 66 days.

(21) Appl. No.: 14/402,488

(22) PCT Filed: May 21, 2013

(86) PCT No.: PCT/EP2013/060419
§ 371 (c)(1),
(2) Date: Nov. 20, 2014

(87) PCT Pub. No.: WO2013/174816
PCT Pub. Date: Nov. 28, 2013

(65) Prior Publication Data
US 2015/0322757 A1  Nov. 12, 2015

(30) Foreign Application Priority Data

May 25, 2012 (GB) .................. 1209253.2

(51) Int. Cl.
| | | |
|---|---|---|
| *C09K 8/52* | (2006.01) | |
| *E21B 43/16* | (2006.01) | |
| *E21B 43/12* | (2006.01) | |
| *C09K 8/584* | (2006.01) | |
| *C11D 3/00* | (2006.01) | |
| *C09K 8/60* | (2006.01) | |
| *C11D 1/88* | (2006.01) | |
| *C11D 1/90* | (2006.01) | |
| *C11D 1/94* | (2006.01) | |

(52) U.S. Cl.
CPC .............. *E21B 43/16* (2013.01); *C09K 8/52* (2013.01); *C09K 8/584* (2013.01); *C09K 8/602* (2013.01); *C11D 3/0094* (2013.01); *E21B 43/121* (2013.01); *C11D 1/88* (2013.01); *C11D 1/90* (2013.01); *C11D 1/94* (2013.01)

(58) Field of Classification Search
CPC ........ E21B 43/26; E21B 43/267; E21B 21/00; E21B 33/138; E21B 37/06; E21B 43/04; E21B 21/003; E21B 33/134; E21B 33/13; E21B 43/16; E21B 21/002; E21B 33/14; E21B 37/00; E21B 43/025; E21B 43/25; C09K 8/035; C09K 8/52; C09K 2208/26; C09K 8/62; C09K 8/12; C09K 8/685; C09K 8/467; C09K 8/68; C09K 8/72; C09K 8/5756; C09K 8/70; C09K 8/80; C09K 8/90; C09K 2208/08; C09K 8/40; C09K 8/602; C09K 8/706; C09K 2208/32; C09K 8/34; C09K 8/524; C09K 8/703; C09K 8/76; C09K 8/805; C09K 8/882; C09K 2208/02; C09K 2208/24; C09K 8/64; C09K 8/725; C09K 8/86; C09K 8/887; C09K 8/92
See application file for complete search history.

(56) References Cited

U.S. PATENT DOCUMENTS

| | | |
|---|---|---|
| 7,134,497 B1 | 11/2006 | Chatterji et al. |
| 7,618,926 B1 | 11/2009 | Pakulski |
| 2004/0121917 A1 | 6/2004 | Pakulski |
| 2005/0164896 A1 | 7/2005 | Dabkowski et al. |
| 2007/0181307 A1 | 8/2007 | Yang |
| 2008/0051301 A1* | 2/2008 | Chen ............... C09K 8/703 507/244 |
| 2009/0111716 A1* | 4/2009 | Hough ............... C09K 8/584 507/214 |

FOREIGN PATENT DOCUMENTS

| | | | |
|---|---|---|---|
| CN | 102114397 | * | 7/2011 |
| WO | WO 01/57168 | * | 8/2001 |
| WO | WO2013/174823 A1 | | 11/2013 |

OTHER PUBLICATIONS

Nguyen, D.T. et al.—"Fundamental Surfactant Properties of Foamers for Increasing Gas Production" (2009) Petroleum Science & Technology, 27, Nos. 7-9 , 743 (18 pages).
Hatchman, K. et al.—"Exploiting Surfactant Synergies in the Development of Foamers for Gas Well Deliquefication" (2011) Proceedings of Chemistry in the Oil Industry XII 83-111 (29 pages).
Pugh, R.J.—Chapter 8, Foam Breaking in Aqueous Systems; Handbook of Applied Surface and Colloid Chemistry, vol. 2 (2002)—28 pages.
U.S. Appl. No. 14/402,461, Hatchman et al., filed Nov. 20, 2014, WO2013/174823.
Kelland, M. A.—Production Chemicals for the Oil and Gas Industry, 2nd Edition (2014), CRC Press, Taylor & Francis Group—Chapter 8 Corrosion Control during Production 191-212 (31 pages).

* cited by examiner

Primary Examiner — Kumar R Bhushan

(57) ABSTRACT

The invention provides a synergistic surfactant composition comprising: (a) a first amphoteric surfactant, which is selected from C8-C22 sultaines, salts thereof, and mixtures thereof; and (b) a second amphoteric surfactant, which is selected from C8-C22 betaines and salts thereof, C8-C22 propionates and salts thereof, and mixtures thereof. This surfactant composition may be used to generate foam that is used for unloading a liquid from a hydrocarbon reservoir. It may be that the liquid unloading of foam generated using the surfactant composition is greater than that of foam generated from the first and second surfactants when they are foamed individually.

18 Claims, 1 Drawing Sheet

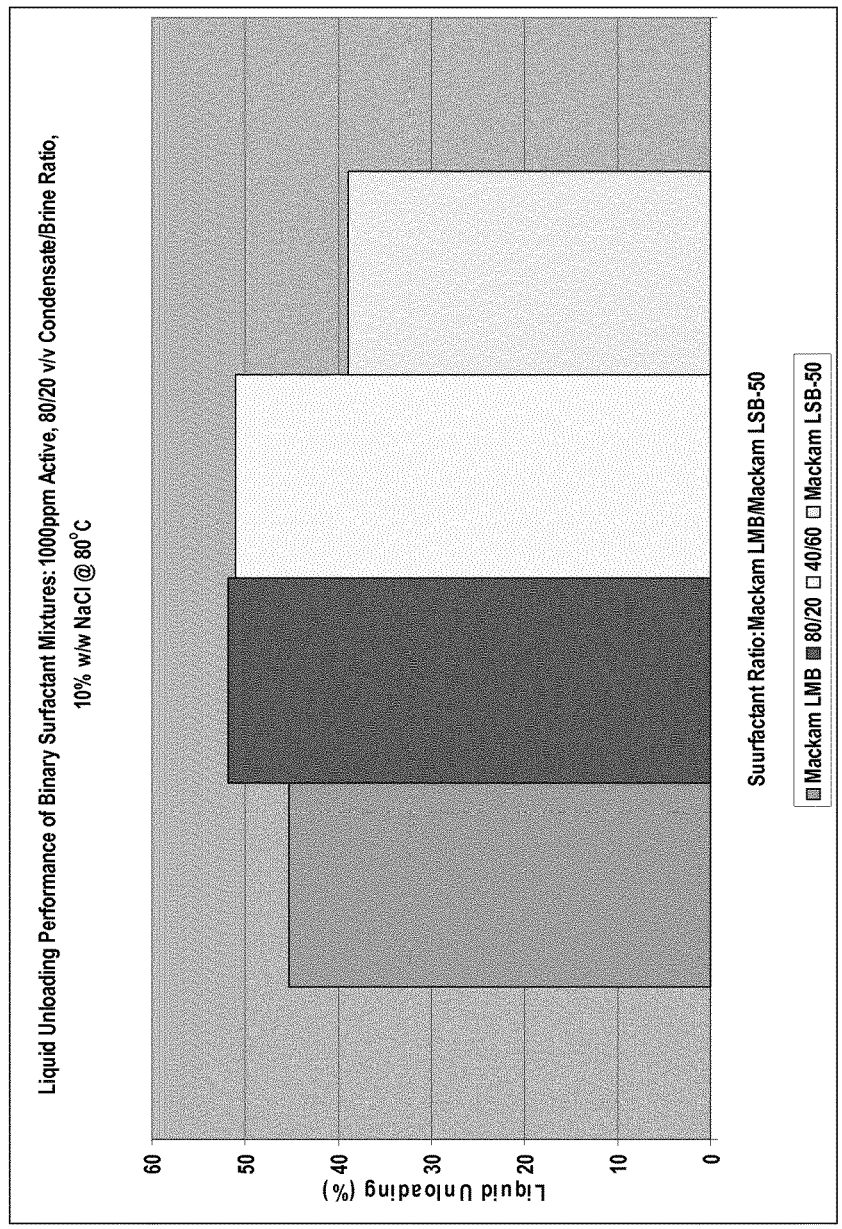

SURFACTANT COMPOSITION

CROSS-REFERENCE TO RELATED APPLICATIONS

The present application is a U.S. national stage entry under 35 U.S.C. § 371 of International Application No. PCT/EP2013/060419 filed May 21, 2013, which claims priority to GB Application No. 1209253.2 filed on May 25, 2012, the whole content of this application being herein incorporated by reference for all purposes.

FIELD OF THE INVENTION

The present invention is concerned with a surfactant composition and, in particular, a synergistic surfactant composition comprising: (a) from about 5 to about 95 wt % of first amphoteric surfactant, which is selected from C8-C22 sultaines, salts thereof, and mixtures thereof; and (b) from about 5 to about 95 wt % of a second amphoteric surfactant, which is selected from C8-C22 betaines and salts thereof, C8-C22 propionates and salts thereof, and mixtures thereof; foams comprising the surfactant compositions; a method of unloading a liquid from a hydrocarbon reservoir; and the use of two amphoteric surfactants to synergistically enhance liquid unloading.

BACKGROUND TO THE INVENTION

It has been recognized that the productivity of natural gas wells deteriorates over time as a result of a loss in reservoir pressure. The loss in reservoir pressure may lead to flooding as a consequence of the ingress of water and hydrocarbon (condensate) from the surrounding formation.

Symptoms of flooding include a drop in the gas velocity or erratic flow caused by liquid aerosols condensing and accumulating to form 'slugs' of fluid. If the liquid is not removed from the well, the fluid level and hydrostatic pressure will increase over a period of time until it reaches a point where it will effectively block the flow of gas to the surface, and from the reservoir into the well.

Well productivity can be improved or maintained by the implementation of artificial lift programmes. These programmes include mechanical methods such as plunger and hydraulic lift, or chemical treatments, in particular foam assisted lift. Surfactants are an integral component of the chemical formulations used in foam assisted lift to unload fluids. Foam assisted lift is cost effective, as well as offering both environmental and performance benefits. Methods for liquid unloading by foam assisted lift are well known in the art.

Foam assisted lift, as its name infers, uses surfactants to create a 'stable' matrix to trap the accumulated fluid (water and hydrocarbons) within the foam's structure. Once formed the foam may then be removed from the reservoir.

The foam is created by shearing forces present in the liquid and gas bubbles are stabilised by the adsorption of surfactant molecules at the gas/liquid interface. The surfactant stabilises the interface by establishing a barrier to coalescence as a result of repulsive steric and electrostatic head group interactions.

Surfactant adsorption also modifies the properties of the interface, e.g. reducing the surface tension. In so doing, it becomes easier to create new interfacial area and the dispersion of gas bubbles is stabilised by further adsorption of surfactant molecules from the bulk liquid. The bubbles continue to multiply and the liquid is incorporated within the film or lamellae separating the bubbles. Lifting the liquid to the surface is permitted when the density of the liquid falls to a value where the threshold flow for lift is achieved, i.e. the critical velocity (Turner Model). In practice, the well is shut for a period of time after the surfactant composition is injected to allow the gas pressure to build and to lower the density of the trapped fluids.

Surfactant formulations are available in both liquid and solid formats. Surfactants from the main chemistry groups have been used in these formulations and include anionic, cationic, amphoteric and non-ionic amphiphiles.

There is, however, an ongoing need for improved surfactant compositions. The present invention addresses this and other problems with the prior art.

SUMMARY OF THE INVENTION

Thus, in a first aspect, the present invention provides surfactant composition, preferably a synergistic surfactant composition, comprising: (a) from about 5% to about 95% by weight of first amphoteric surfactant, which is selected from C8-C22 sultaines, salts thereof, and mixtures thereof; and (b) from about 5% to about 95% by weight of a second amphoteric surfactant, which is selected from C8-C22 betaines and salts thereof, C8-C22 propionates and salts thereof, and mixtures thereof.

In a second aspect, the present invention provides foam generated from the composition according to the first aspect.

In a third aspect, the present invention provides the use of foam according to the second aspect of the invention for unloading liquid from a hydrocarbon reservoir.

Also provided, in another aspect, is the use of the surfactant composition according to the first aspect to generate foam that is used for unloading a liquid from a hydrocarbon reservoir.

In a fourth aspect, the present invention provides a method of unloading liquid from a hydrocarbon reservoir, the method comprising: introducing two amphoteric surfactants into the liquid in order to foam the liquid; and then removing foamed liquid from the reservoir.

The two amphoteric surfactants may be introduced into the liquid simultaneously (e.g. in the form of a composition according to the first aspect), or sequentially, or separately (e.g. with a gap between their addition of 1 minute or more, such as 5 minutes or more). When added sequentially or separately, the first amphoteric surfactant may be added first, with the second amphoteric surfactant being added second, or the second amphoteric surfactant may be added first, with the first amphoteric surfactant being added second.

In a fifth aspect the invention provides, the use of two amphoteric surfactants in combination to synergistically enhance liquid unloading from a hydrocarbon reservoir, wherein the first amphoteric surfactant is selected from C8-C22 sultaines, salts thereof, and mixtures thereof; and the second amphoteric surfactant is selected from C8-C22 betaines and salts thereof, C8-C22 propionates and salts thereof, and mixtures thereof.

In the aspects of the invention, the following may apply:

The first amphoteric surfactant is selected from C8-C22 sultaines, salts thereof, and mixtures thereof; and the second amphoteric surfactant is selected from C8-C22 betaines and salts thereof, C8-C22 propionates and salts thereof, and mixtures thereof. Where reference is made herein to "salts thereof" these may be any suitable salts. In one embodiment the salt is a salt based on a monovalent cation, such as Na, K, or $NH_4$. In one embodiment, the salt is a salt based on an alkali metal, e.g. Na or K. The use of alternative salts, e.g.

alkali earth metal salts such as Ca and Mg could also be contemplated; however the solubility of the product would need to be borne in mind when using such salts.

In embodiments of the invention the C8-C22 sultaine is typically selected from the group consisting of alkyl hydroxysultaines, alkyamidopropyl hydroxysultaines, alkyl amphohydroxypropylsulfonates, salts thereof, and combinations thereof.

In further embodiments of the invention, the C8-C22 betaine is selected from the group consisting of alkyl dimethylbetaines, alkylamidopropyl betaines, alkylampho(di) acetates, salts thereof, and combinations thereof.

In still further embodiments of the invention, the C8-C22 propionate is selected from the group consisting of alkyl ampho(di)propionate, alkyl aminopropionates, alkyl amphopropionates, salts thereof, and combinations thereof.

It may be that the first amphoteric surfactant is selected from C9-C21 sultaines, salts thereof, and mixtures thereof; such as C10-C20 sultaines, salts thereof, and mixtures thereof; or C11-C19 sultaines, salts thereof, and mixtures thereof; or C12-C18 sultaines, salts thereof, and mixtures thereof.

It may be that the second amphoteric surfactant is selected from C9-C21 betaines and salts thereof, C9-C21 propionates and salts thereof, and mixtures thereof; such as C10-C20 betaines and salts thereof, C10-C20 propionates and salts thereof, and mixtures thereof; or C11-C19 betaines and salts thereof, C11-C19 propionates and salts thereof, and mixtures thereof; or C12-C18 betaines and salts thereof, C12-C18 propionates and salts thereof, and mixtures thereof.

It has been identified that it is possible to obtain synergistic performance benefits, such as enhancing foam stability and liquid unloading, using said surfactant compositions. In particular, it has been found that it is possible to use combinations of amphoteric surfactants, in particular a C8-C22 sultaine with a C8-C22 betaine or C8-C22 propionate, to provide enhanced liquid unloading performance.

It has also been found that the formulations are suitable for applications in brines containing high levels of dissolved electrolytes, e.g. 5% w/w or more, or 10% w/w or more, or 20% w/w or more of dissolved electrolytes (such as NaCl, $CaCl_2$, $NaHCO_3$, $Na_2CO_3$ and the like). The brine may, in one embodiment, contain from 0 to 30% w/w, or from 0 to 25% w/w, or from 0.5 to 20% w/w, or from 1 to 15% w/w, or from 5 to 10% w/w, of dissolved electrolytes.

Furthermore, low corrosivity formulations may be prepared by the desalination of the sultaine and betaine compositions to remove undesirable by-products, such as sodium chloride, which may cause corrosion problems. Desalinated compositions are desirable for use in formulations which are injected into a well using a capillary string.

In preferred embodiments, the surfactant composition comprises less than about 0.5% (e.g. from about 0.01 to about 0.4%) by weight NaCl, preferably from about 0.01 to about 0.2% by weight as chloride. Low salt amphoteric surfactants may be produced by any appropriate process, including reverse osmosis.

Therefore in one embodiment, the sultaine is a low salt sultaine, such as one with less than about 0.5% (e.g. from about 0.01 to about 0.4%) by weight NaCl, preferably from about 0.01 to about 0.2% by weight as chloride.

Amphoteric surfactants have a high tolerance to dissolved electrolytes and pose a lower risk of forming emulsions with hydrocarbons compared to both anionic and non-ionic surfactants. Moreover, it has been found that the emulsification performances of the compositions according to the invention are similar to those of the individual amphoteric surfactants.

In embodiments, the surfactant composition is a synergistic surfactant composition. Typically, a synergistic surfactant composition will show at least one, optionally more than one, improved property when compared to both the first amphoteric surfactant and the second amphoteric surfactant when tested individually. Typically, foam generated from the synergistic surfactant composition will show at least one, optionally more than one, improved property when compared to foam generated from both the first amphoteric surfactant and the second amphoteric surfactants when foamed individually.

Preferably, the liquid unloading of foam generated using the surfactant composition is improved compared to that of foam generated from the first and second amphoteric surfactant when used individually.

It may be that the flash foam volume of the surfactant composition is greater than the flash foam volume of the first and second amphoteric surfactant when foamed individually. It may be that the foam quality of foam generated from the surfactant composition is greater than the foam quality of foam generated from the first and second amphoteric surfactant when foamed individually. It may be that the half-life of foam generated from the surfactant composition is greater than the half-life of foam generated from the first and second amphoteric surfactant when foamed individually.

Preferably, the combination of the first surfactant and the second surfactant provides a synergistic surfactant composition.

Preferably, therefore, the combination will show at least one, optionally more than one, improved property when compared to the first surfactant and the second surfactant when used individually. The two surfactants may be introduced into the liquid simultaneously (e.g. in the form of a composition according to the first aspect), or sequentially, or separately (e.g. with a gap between their addition of 1 minute or more, such as 5 minutes or more). When added sequentially or separately, the first surfactant may be added first, with the second surfactant being added second, or the second surfactant may be added first, with the first surfactant being added second.

The surfactant compositions, foams and methods according to the invention have been found to be particularly useful in foam assisted lift from oil and gas reservoirs, e.g. oil or gas wells, pipelines or flowlines. The surfactant compositions, foams and methods according to the invention may, for example, be used in relation to gas wells that are suffering a loss of reservoir pressure.

They are also useful in other oil and gas field applications, such as well completion; drilling mud removal (chemical wash); or to stimulate production.

The formulations are also suitable for use in the production of natural gas trapped in sensitive formations (e.g. shales). The surfactant compositions, foams and methods according to the invention may also be used in shale or tight gas applications, as underbalanced drilling fluid systems, and to remove water from the well bore after it has been completed. The formulations may also be used in topside applications, such as pipeline deliquification or cleaning.

The surfactant composition may suitably be used in an industrial aqueous system. As noted above, this may be an oil or gas field application. The industrial aqueous system may in another embodiment be an aqueous system in a chemical plant, e.g. a chemical manufacturing, processing or distribution plant. The industrial aqueous system may in another alternative embodiment be a water plant, e.g. an industrial water treatment or distribution system. The industrial aqueous system may in another alternative embodiment be a paper manufacturing plant. In one embodiment, the aqueous fluid is at a temperature of 100° C. or less, such as 90° C. or less, e.g. 80° C. or less, or 70° C. or less, or 60° C. or less.

In one embodiment, the aqueous fluid has a pH that is about neutral, e.g. having a pH of from about 6 to about 8, e.g. from about 6.5 to about 7.5, or from about 7 to about 8.

The invention also relates to the use of the composition of the invention in any one of said applications.

In one embodiment, the invention is used with a gas well. The composition of the invention facilitates the production of production fluid having a significant amount of light hydrocarbon products, especially natural gas condensates. As used herein, the term "light hydrocarbon(s)" is distinguished from "heavy hydrocarbons", which refers to those hydrocarbons that are liquid under ambient temperatures and pressures such as crude oil.

In gas well embodiments, the compositions serve to foam the production fluid, in part to produce it at the surface for sale, but often primarily to move the production fluid out of the way so that it does not impede the flow of natural gas from the oil and gas well.

In another embodiment, the invention is used to increase the production of an oil well. In an oil well, the production fluids often have a substantial proportion of heavy hydrocarbons such as crude oil. The compositions of the invention may be employed with the use of an injected gas such as nitrogen or carbon dioxide. In this and similar embodiments, the composition of the invention serves to foam the production fluid to unload the heavy hydrocarbons, which are the products of greatest interest in an oil well. By foaming the heavy hydrocarbons, the heavy hydrocarbons are reduced in viscosity and thus more easily brought to the surface. The invention may also be useful in removing an excess of brine that may be acting as an impediment to hydrocarbon flow from the reservoir and to the surface.

In the practice of the invention, the surfactants are injected or otherwise introduced into a production fluid. It may be that the surfactants are provided together, in the form of a composition, or they may be provided separately. Ideally, the production fluid is then agitated in the presence of a gas. Often, the gas itself is the source of the agitation. Sometimes, the gas and the agitation are due to the energetic production of natural gas from the oil and gas reservoir. In some embodiments, the gas, the agitation and even both the gas and agitation are introduced downhole by the well operator.

In another embodiment, the invention is used in relation to gas/oil pipelines or flow lines. The ascending and descending of a the pipeline or flowline creates "valleys" that allow for, in the case of natural gas, an accumulation of any fluid, the composition may be used to foam and thereby unload the liquid from the valley to allow for the unimpeded flow of gas. Even in a pipeline or flow line transporting crude oil, the accumulation of production fluids that are primarily brine may be an impediment to the flow of production fluid that is primarily crude oil. In such cases the invention may also be used to foam and thereby sweep the production fluid out of the way to allow for improved flow of the production fluid that is primarily crude oil.

In an embodiment of the invention, the surfactant composition further comprises one or more additives selected from the group consisting of solvents, demulsifiers, biocides, dispersants, scale inhibitors, chelants, scavengers, corrosion inhibitors, co-surfactants, and combinations thereof.

In some embodiments, the total weight of the first amphoteric surfactant and the second amphoteric surfactant consists of from about 10% to about 80% by weight of the first amphoteric surfactant; such as from about 20% to about 60% by weight of the first amphoteric surfactant; e.g. from 20% to 40% by weight of the first amphoteric surfactant.

Typically, the ratio of the first amphoteric surfactant to the second amphoteric surfactant by weight is from about 5:1 to about 1:5, preferably from about 4:1 to about 1:4; such as from about 3:1 to about 1:3; or from about 3:2 to about 2:3; or from about 2:1 to about 1:2; e.g. 1:1.

It is to be noted that betaines (especially at neutral or low pH) tend to have cationic characteristics compared to the sultaine, which can be considered to be anionic. This contrast in characteristics between the pair of surfactants can be seen as contributing to the synergistic response. In a similar manner, propionates tend to have cationic characteristics, compared to the sultaine which can be considered to be anionic, and thus this can help to explain the synergy that is seen in the present invention.

BRIEF DESCRIPTION OF THE DRAWING

For a detailed description of various embodiment of the invention, reference will now be made to the accompanying drawing, in which:

The FIG. 1 appended hereto illustrates the effect for the blend of the two surfactants on the liquid unloading results.

DETAILED DESCRIPTION OF THE INVENTION

The present invention provides surfactant composition comprising: (a) from about 5% to about 95% by weight, preferably from about 10% to about 90% by weight, e.g. from about 20% to about 80% by weight, such as from 20% to 40% by weight, of first amphoteric surfactant, which is selected from C8-C22 sultaines, salts thereof, and mixtures thereof; and (b) from about 5% to about 95% by weight, preferably from about 10% to about 90% by weight, e.g. from about 20% to about 80% by weight, such as from 60% to 80% by weight, of a second amphoteric surfactant, which is selected from C8-C22 betaines and salts thereof, C8-C22 propionates and salts thereof, and mixtures thereof.

It may be that the surfactant composition comprises: (a) from about 5% to about 90% by weight, e.g. from about 10% to about 80% by weight, or from about 15% to about 70% by weight, or from 20% to 60% by weight, of the first amphoteric surfactant; and (b) from about 5% to about 90% by weight, e.g. from about 10% to about 80% by weight, or from about 15% to about 70% by weight, or from 20% to 60% by weight, of the second amphoteric surfactant.

It may be that the surfactant composition comprises: from about 20% to about 80% by weight, or from about 25% to about 80% by weight, or from about 25% to about 75% by weight, e.g. from about 30% to about 80% by weight, or from about 40% to about 80% by weight, or from 40% to 70% by weight, or from 40% to 60% by weight, of the first amphoteric surfactant.

It may be that the surfactant composition comprises: from about 20% to about 80% by weight, or from about 20% to about 75% by weight, or from about 25% to about 75% by weight, e.g. from about 20% to about 70% by weight, or from about 20% to about 60% by weight, or from 30% to 60% by weight, or from 40% to 60% by weight, of the second amphoteric surfactant.

It may be that the surfactant composition comprises: (a) from about 20% to about 80% by weight, or from about 25% to about 80% by weight, or from about 25% to about 75% by weight, e.g. from about 30% to about 80% by weight, or from about 40% to about 80% by weight, or from 40% to 70% by weight, or from 40% to 60% by weight, of the first amphoteric surfactant; and (b) from about 20% to about 80% by weight, or from about 20% to about 75% by weight, or from about 25% to about 75% by weight, e.g. from about 20% to about 70% by weight, or from about 20% to about 60% by weight, or from 30% to 60% by weight, or from 40% to 60% by weight, of the second amphoteric surfactant. Any of the ranges (a) for the first surfactant may be used with any of the ranges (b) for the second surfactant.

It may be that the ratio of the first surfactant to the second surfactant, by weight, is from about 10:1 to about 1:10, such as from 9:1 to 1:9; preferably from about 8:1 to about 1:8; more preferably from about 5:1 to about 1:5. In one preferred embodiment, the ratio of the first surfactant to the second surfactant, by weight, is from about 4:1 to about 1:4, such as from about 3:1 to about 1:3, or from about 2:1 to about 1:2; or from about 3:2 to about 2:3; e.g. about 1:1.

In one preferred embodiment, the ratio of the first surfactant to the second surfactant, by weight, is from about 4:1 to about 1:4, such as from about 4:1 to about 1:3, or from about 4:1 to about 1:2; or from about 4:1 to about 2:3; or from about 3:1 to about 1:2; or from about 3:1 to about 2:3; or from about 3:2 to about 2:3; e.g. about 1:1.

It may be that the surfactant composition comprises a combined amount of first surfactant plus second surfactant that is in the range of from about 10% to about 95% by weight of the total composition, or from about 15% to about 95%, or from about 15% to about 90%, or from about 20% to about 90%, or from about 25% to about 85%, by weight. It may be that the surfactant composition comprises a combined amount of first surfactant plus second surfactant that is in the range of from about 15% to about 85% by weight, or from about 20% to about 80% by weight, or from 25% to 75% by weight, or from 25% to 70% by weight, or from 30% to 65% by weight, or from 35% to 60% by weight.

It may be that the combined amount of first surfactant plus second surfactant makes up 60% or more by weight of the total amount of surfactant used (in the composition, method or use of the invention), such as 70% or more, or 80% or more, or 90% or more, or 95% or more, or 96% or more, or 98% or more. It may be that the combined amount of first surfactant plus second surfactant makes up from 75% to 100% by weight of the total amount of surfactant used (in the composition, method or use of the invention), or from 80% to 99%, or from 85% to 98%, or from 90 to 97%, or from 90 to 95%, by weight.

The first amphoteric surfactant is selected from C8-C22 sultaines, salts thereof, and mixtures thereof. The first amphoteric surfactant may be selected from C8-C20 (e.g. C8-C18 or C8-C14) sultaines, salts thereof, and mixtures thereof.

It may be that the first amphoteric surfactant is a C8-C22 sultaine that is selected from the group consisting of alkyl hydroxysultaines, alkylamidopropyl hydroxysultaines, alkyl amphohydroxypropylsulfonates, salts thereof, and combinations thereof.

In embodiments of the invention the first amphoteric surfactant is a C8-C20 (e.g. C8-C18) sultaine selected from the group consisting of alkyl hydroxysultaines, alkylamidopropyl hydroxysultaines, alkyl amphohydroxypropylsulfonates, salts thereof, and combinations thereof.

In one embodiment, the C8-C22 (e.g. C8-20, or C8-18, or C8-14, or C8-12) sultaine is selected from alkyl hydroxysultaines, alkyl amidopropyl hydroxysultaines, salts thereof, and combinations thereof.

It may be that the first amphoteric surfactant is selected from C9-C21 sultaines, salts thereof, and mixtures thereof; such as C10-C20 sultaines, salts thereof, and mixtures thereof; or C11-C19 sultaines, salts thereof, and mixtures thereof; or C12-C18 sultaines, salts thereof, and mixtures thereof.

In some embodiments, the most effective synergistic effects are found with the use of C8-C16 sultaines, such as C8-C14 sultaines, e.g. C10 sultaines and/or C12 sultaines and/or C14 sultaines. However, good results are still obtained with sultaines with longer carbon chains, e.g. C18 sultaines. C18 sultaines may, in one embodiment, find use where the present invention is used in relation to enhanced oil recovery or fracturing.

In some embodiments of the invention, short chain surfactants (e.g. C8 and/or C10) may be used in combination with of C12 and/or C14 surfactants. The inclusion of a C8 and/or C10 product may, in some embodiments, enhance low temperature stability and foam stability.

It may be that the first amphoteric surfactant is selected from C8-C18 sultaines, salts thereof, and mixtures thereof; such as C8-C16 sultaines, salts thereof, and mixtures thereof; or C8-C14 sultaines, salts thereof, and mixtures thereof; or C8-C12 sultaines, salts thereof, and mixtures thereof.

In some embodiments of the invention the first surfactant is selected from:
Lauramidopropyl hydroxysultaine
Cocamidopropyl hydroxysultaine.
Caprylamphohydroxypropyl sulfonate
Sodium lauroamphohydroxylpropyl sulfonate In some embodiments of the invention the first surfactant is selected from:
Lauramidopropyl hydroxysultaine
Cocamidopropyl hydroxysultaine.

Examples of amphoteric surfactants that can be used as the first surfactant, and commercially available products of this type, include:

| Surfactant | Available commercially from Solvay as | Active (%) |
| --- | --- | --- |
| Lauramidopropyl hydroxysultaine (95% lauric fatty acid cut) | Mackam LSB-50 | 40 |
| Lauramidopropyl hydroxysultaine (with <0.5% NaCl) | Mackterra LSB-50 ULS | 40 |
| Cocamidopropyl hydroxysultaine | Mackam CBS-50G-E | 40 |
| Caprylamphohydroxypropyl sulfonate | Mackam JS | 40 |
| Sodium lauroamphohydroxylpropyl sulfonate | Mackam LS | 35 |

The second amphoteric surfactant is selected from C8-C22 betaines and salts thereof, C8-C22 propionates and salts thereof, and mixtures thereof. The second amphoteric surfactant may be selected from C8-C20 (e.g. C8-C18) betaines and salts thereof, C8-C20 (e.g. C8-C18) propionates and salts thereof, and mixtures thereof.

It may be that the second amphoteric surfactant is one or more surfactant (e.g. two or more surfactants) selected from:
C8-C22 betaines selected from the group consisting of alkyl dimethylbetaines, alkylamidopropyl betaines, alkylampho(di)acetates, salts thereof, and combinations thereof; and C8-C22 propionates selected from the group consisting of alkyl ampho(di)propionates (i.e. alkyl ampho monopropionates and alkyl ampho dipropionates), alkyl amino(di) propionates (i.e. alkyl amino monopropionates and alkyl amino dipropionates), alkyl imino(di) propionates (i.e. alkyl imino monopropionates and alkyl imino dipropionates), salts thereof, and combinations thereof.

It may be that the second amphoteric surfactant is one or more surfactant (e.g. two or more surfactants) selected from:
- C8-C20 (e.g. C8-18 or C8-14) betaines selected from the group consisting of alkyl dimethylbetaines, alkylamidopropyl betaines, alkylampho(di)acetates, salts thereof, and combinations thereof; and
- C8-C20 (e.g. C8-18 or C8-14) propionates selected from the group consisting of alkyl ampho(di)propionates, alkyl amino(di)propionates, alkyl imino(di)propionates, salts thereof, and combinations thereof.

It may be that the second amphoteric surfactant is one or more surfactant (e.g. two or more surfactants) selected from:
- C8-C20 (e.g. C8-18, or C8-14, or C8-12) betaines selected from the group consisting of alkyl dimethylbetaines, alkylamidopropyl betaines, salts thereof, and combinations thereof; and
- C8-C20 (e.g. C8-18, or C8-14, or C8-12) propionates selected from the group consisting of alkyl ampho(di) propionates, alkyl amino(di)propionates, salts thereof, and combinations thereof.

In one embodiment, it may be that the second amphoteric surfactant is one or more surfactant (e.g. two or more surfactants) selected from:
- C8-C20 (e.g. C8-18, or C8-14, or C8-12) betaines selected from the group consisting of alkyl dimethylbetaines, alkylamidopropyl betaines, salts thereof, and combinations thereof.

It may be that the second amphoteric surfactant is selected from C9-C21 betaines and salts thereof, C9-C21 propionates and salts thereof, and mixtures thereof; such as C10-C20 betaines and salts thereof, C10-C20 propionates and salts thereof, and mixtures thereof; or C11-C19 betaines and salts thereof, C11-C19 propionates and salts thereof, and mixtures thereof; or C12-C18 betaines and salts thereof, C12-C18 propionates and salts thereof, and mixtures thereof.

It may be that the second amphoteric surfactant is selected from C8-C18 betaines and salts thereof, C8-C18 propionates and salts thereof, and mixtures thereof; such as C8-C16 betaines and salts thereof, C8-C16 propionates and salts thereof, and mixtures thereof; or C8-C14 betaines and salts thereof, C8-C14 propionates and salts thereof, and mixtures thereof; or C8-C12 betaines and salts thereof, C8-C12 propionates and salts thereof, and mixtures thereof.

In some embodiments of the invention the second surfactant is selected from:
Lauramidopropyl betaine
Cocoamidopropyl betaine
Disodium lauramphodiacetate
Disodium lauraminodipropionate
Disodium cocoamphodipropionate
Blends of caprylamidopropyl betaine and capramidopropyl betaine
Blends of caprylamphodiacetate and caprylamphodipropionate
Sodium octyl iminopropionate
C12/C14 alkyl dimethyl betaine and any variations of these surfactants where the surfactant is not in the form of a salt, or is in the form of a potassium salt, or is in the form of a sodium salt.

In some embodiments of the invention the second surfactant is selected from:
Lauramidopropyl betaine
Disodium lauramphodiacetate
Disodium lauraminodipropionate
Disodium cocoamphodipropionate
Blends of caprylamidopropyl betaine and capramidopropyl betaine
Blends of caprylamphodiacetate and caprylamphodipropionate
Sodium octyl iminopropionate and any variations of these surfactants where the surfactant is not in the form of a salt, or is in the form of a potassium salt, or is in the form of a sodium salt.

In some embodiments of the invention the second surfactant is selected from:
Lauramidopropyl betaine
Cocoamidopropyl betaine
Disodium lauramphodiacetate
Disodium lauraminodipropionate
Disodium cocoamphodipropionate
Blends of caprylamidopropyl betaine and capramidopropyl betaine
C12/C14 alkyl dimethyl betaine and any variations of these surfactants where the surfactant is not in the form of a salt, or is in the form of a potassium salt, or is in the form of a sodium salt.

In some embodiments of the invention the second surfactant is selected from:
Lauramidopropyl betaine
Cocoamidopropyl betaine
Blends of caprylamidopropyl betaine and capramidopropyl betaine
C12/C14 alkyl dimethyl betaine and any variations of these surfactants where the surfactant is not in the form of a salt, or is in the form of a potassium salt, or is in the form of a sodium salt.

Examples of amphoteric surfactants that can be used as the second surfactant, and commercially available products of this type, include:

| Surfactant | Available commercially from Solvay as | Active (%) |
| --- | --- | --- |
| Lauramidopropyl betaine (70% lauric fatty acid cut) | Mackam LMB | 30 |
| Disodium lauramphodiacetate | Miranol L32-E | 30 |
| Disodium lauraminodipropionate | Mirataine H2-CHA | 30 |
| Disodium cocoamphodipropionate | Mackam 2CSF-40CG | 40 |
| Blend of caprylamidopropyl betaine and capramidopropyl betaine | Mackam CCAB-50 | 40 |
| Blend of caprylamphodiacetate and caprylamphodipropionate | Mackam MEJ | 30 |
| Sodium octyl iminopropionate | Mackam OIP-40 | 40 |

AGRHO FKC/1000 (ex Solvay) can also be mentioned, which is a potassium salt of an alkyl dimethyl betaine (70% C12 alkyl, 30% C14 alkyl).

In one embodiment, the second surfactant is a betaine and the sultaine:betaine ratio is from 10:90 to 90:10, especially from 20:80 to 80:20, e.g. from 25:75 to 75:25 or from 30:70 to 70:30. In one such embodiment, the first surfactant is a hydroxysultaine (e.g. alkyl hydroxysultaine, alkyl amidopropyl hydroxysultaine, or salt thereof) and the sultaine:betaine ratio is from 20:80 to 80:20. It may be that the betaine is a C8-18 betaine, e.g. C8-14 or C10-14 or C12-16 betaine. It may be that the sultaine is a C8-18 sultaine, e.g. C8-14 or C10-14 or C12-16 sultaine.

In one embodiment, the second surfactant is a betaine and the sultaine (e.g. hydroxysultaine) and the betaine have the same carbon chain length. It may, for example, be that the sultaine and the betaine are both C8, or the sultaine and the betaine are both C10, or the sultaine and the betaine are both C12, or the sultaine and the betaine are both C14. It may be that the sultaine is an alkyl hydroxysultaine, alkyl amidopropyl hydroxysultaine, or salt thereof.

In one embodiment, the second surfactant is a propionate and the sultaine:propionate ratio is from 10:90 to 40:60, e.g. from 20:80 to 40:60 or from 25:75 to 40:60 or from 20:80 to 30:70. In one such embodiment, the first surfactant is a hydroxysultaine (e.g. alkyl hydroxysultaine, alkyl amidopropyl hydroxysultaine, or salt thereof). It may be that the propionate is a C8-18 propionate, e.g. C8-14 or C10-14 or C12-16 propionate. It may be that the sultaine is a C8-18 sultaine, e.g. C8-14 or C10-14 or C12-16 sultaine.

It may be that in the present invention the first and second amphoteric surfactants are used in the reservoir so as to give a total active surfactant concentration of 100 ppm or more; or 150 ppm or more; or 200 ppm or more; or 250 ppm or more; or 300 ppm or more; or 400 ppm or more; or 500 ppm or more. For example, it may be from 50 ppm to 10,000 ppm; or from 100 ppm to 5,000 ppm; preferably from 150 ppm to 5,000 ppm, e.g. from 300 ppm to 3,000 ppm or from 500 ppm to 2,000 ppm. In one embodiment, it is from 200 to 5,000 ppm, such as from 200 to 1500 ppm, e.g. from 250 to 1250 ppm.

The surfactant composition is preferably a synergistic surfactant composition. Typically, a synergistic surfactant composition will show at least one, optionally more than one, improved property when compared to both the first amphoteric surfactant and the second amphoteric surfactant when tested individually. Typically, foam generated from the synergistic surfactant composition will show at least one, optionally more than one, improved property when compared to foam generated from both the first amphoteric surfactant and the second amphoteric surfactants when foamed individually.

Preferably, the liquid unloading of foam generated using the surfactant composition is improved compared to that of foam generated from the first and second amphoteric surfactant when used individually.

Liquid unloading potentials of the foamer systems are calculated, as described in D T Nguyen, Petroleum Science & Technology, 2009, 27, 743 'Exploiting Surfactant Synergies in the Development of Foamers for Gas Well Deliquefication', K Hatchman, C Jones, B Downward, G Collins, A Fellows, Proceedings of Chemistry In The Oil Industry XII, Royal Society of Chemistry (2011), using the following expression:

$$\text{Liquid unloading (\%)} = \frac{\text{Weight of fluid recovered}}{\text{Total weight of fluid (brine + hydrocarbon)}} \times 100$$

It may be that the flash foam volume of the surfactant composition is greater than the flash foam volume of the first and second amphoteric surfactant when foamed individually. The flash volume of a surfactant composition is the initial volume of foam generated from the composition.

Typically, the flash foam volume is measured by taking a surfactant composition and making a 10% by weight active aqueous stock solution using deionised water, diluting the stock solution in a 10% w/w aqueous sodium chloride solution, subjecting the mixture to high shear for a predetermined length of time (e.g. 30 seconds) at ambient temperature (20° C.) and then transferring the foam immediately to a measuring cylinder. Typically, the concentration of the surfactant in the brine is 1000 ppm.

It may be that the foam quality of foam generated from the surfactant composition is greater than the foam quality of foam generated from the first and second amphoteric surfactant when foamed individually.

Foam quality (as described in U.S. Pat. No. 7,618,926 B1) is given by:

$$\text{Foam quality (\%)} = \frac{(V_f - V_1)}{V_f} \times 100$$

Where $V_f$ is the flash foam volume and $V_1$ is the solution volume (e.g. 200 ml). A high foam quality value indicates that the foam texture is dense, which, in turn, relates to the packing of surfactant molecules at the gas/liquid interface. The better the packing, the more the foam will persist. Lower values indicate that the foam structure is less able to retard liquid drainage and therefore the foam is not as stable.

It may be that the half-life of foam generated from the surfactant composition is greater than the half-life of foam generated from the first and second amphoteric surfactant when foamed individually. The half-life of the foam is defined as the time taken for half the original fluid volume to drain from the foam (e.g. 100 ml). An increase in the half-life corresponds to a reduction in the liquid drainage rate and reflects the texture of the foam. Denser foams, as a rule, tend to take longer to drain and therefore are more persistent.

The surfactant compositions of the invention may comprises further additives.

The surfactant composition may optionally further comprise one or more additives selected from the group consisting of: solvents, demulsifiers, biocides, dispersants, scale inhibitors, chelants, scavengers, corrosion inhibitors, co-surfactants, and combinations thereof. One or more coupling agents may be present as an optional component.

When a solvent is used as an additional component, the solvent may be aqueous or may be organic. The solvent may be any suitable solvent that is compatible with the aqueous fluid. Examples of solvents include water, dimethyl sulfoxide (DMSO), alkylene glycols, glycol ethers, and tetrahydrofuran (THF). Solvents may be selected from the group consisting of alcohols, preferably methanol, iso-propanol or butanol; and combinations thereof. In one embodiment the solvent is selected from: water, dimethyl sulfoxide (DMSO), alkylene glycols, glycol ethers, tetrahydrofuran (THF), C1-4 straight or branched chain alcohols, (e.g. methanol, iso-propanol, n-butanol), and combinations thereof.

Typically, the solvent comprises from about 1% to about 5% by weight of the surfactant composition. However, it could be from about 0.5 to about 20% by eight, e.g. from 1 to 15% by weight or from 2 to 10% by weight.

Scale inhibitors may suitably be selected from the group consisting of halite inhibitors, preferably polyaspartates; tetrasodium iminosuccinate; citrates; phosphonates; vinyl copolymers; polyacrylates; polymaleates; polysulfonates; and bisphosphonates; and combinations thereof. Scale inhibitors may be selected from sequestrants, such as sodium tripolyphosphate, sodium ethylenediamine tetracetate, sodium nitrilo triacetate, tetra potassium pyrophosphate, acetodiphosphonic acid and its salts, alkanolamine esters of phosphoric acid, e.g. triethanolamine phosphates ester, ammonium trismethylene phosphonic acid and its salts, ethylenediamine tetrakis (methylene phosphonic) acid and its salts, diethylenetriamine pentakis (methylene phosphonic) acid, hexamethylenediamine tetrakis (methylene phosphonic) acid, bishexamethylenetriamine pentakis (methylene phosphonic) acid, and ethanolamine bis(methylenephosphonic) acid and its salts.

Typically, when scale inhibitor is included, it will comprise from about 1% to about 5% by weight of the surfactant composition.

If a scavenger is included, typically it may be selected from the group consisting of hydrogen sulphide scavengers, oxygen scavengers, and combinations thereof. Typically, when scavenger is included, it will comprise from about 1% to about 5% by weight of the surfactant composition. However, in embodiments there may be no scavenger present.

When a corrosion inhibitor is included, that additional corrosion inhibitor may be selected from non-ionic, anionic, cationic and amphoteric corrosion inhibitors.

In one embodiment, the corrosion inhibitor is a non-ionic corrosion inhibitor, such as an inhibitor selected from fatty diamine derivatives of oleic or tall oil fatty acids, and fatty acid alkanolamides such as monoisopropyl oleamide. In one embodiment, the corrosion inhibitor is an anionic corrosion inhibitor, such as an inhibitor selected from alkyl and alkyl ether phosphate esters, acyl sarcosinates, taurides and alkyl ether carboxylic acids. In one embodiment, the corrosion inhibitor is a cationic corrosion inhibitor, such as an inhibitor selected from quaternary ammonium salts, such as alkyl trimethyl ammonium halides or benzalkonium derivatives, fatty amines, amidoamines (including alkylamidopropyl amines and imidazolines). For example, it may be an alkyl hydroxyethyl or alkyl aminoethyl derivative of oleic or tall oil fatty acids.

Typically, when corrosion inhibitor is included, it will comprise from about 0.1% to about 10% by weight of the surfactant composition, e.g. from about 0.5% to about 5% by weight of the surfactant composition.

Synergists for corrosion inhibitors may optionally be used and are typically selected from the group consisting of mercaptocarboxylic acids, preferably thioglycolic acid; polyaminocaboxylic acids. Typically, when present, they comprise from about 1% to about 5% by weight of the surfactant composition. Further information may be found in Chapter 8, 'Production Chemicals for the Oil and Gas Industry', M A Kelland, CRC Press (2010).

When an additional surfactant is used (i.e. in addition to the first surfactant and second surfactant), the additional surfactant may be a cationic surfactant (for example it may be selected from benzalkonium salts and C10-20 alkyl trimethyl ammonium salts. Alternatively, the additional surfactant may be anionic (for example it may be selected from C10-20 alkyl benzene sulphonates, C10-20 olefin sulphonates, C10-20 alkyl sulfates, C10-20 alkyl 1 to 25 mole ether sulfates, C10-20 paraffin sulphonates, C10-20 alkyl phenol sulfates, lignin sulphonates, fatty ester sulphonates, C10-20 alkyl phenol ether sulfates, C10-20 alkyl ethanolamide sulfates, and C10-20 alpha sulphofatty acid salts). The additional surfactant might alternatively be non-ionic (for example it may be selected from ethoxylated fatty acids, ethoxyl/propyleneoxy block copolymers, ethoxylated fatty amines, mono- and di-alkanolamides, amine oxides and C10-20 acyl sorbitan and glyceryl ethoxylates). The additional surfactant might alternatively be an amphoteric surfactant (for example it may be selected from alkyl amphoacetates, alkyl amphopropionates, alkyl iminopropionates, alkyl amphohydroxypropyl sulfonates, alkyl hydroxysultaines, alkyl amidopropyl hydroxysultaines, alkyldimethyl and alkylamidopropyl betaines).

Additional surfactant might for example be included in an amount of from 0.5 to 10% by weight, e.g. from 1 to 5% by weight.

A demulsifier may be beneficial as an additional component when the surfactant is being used in oilfield applications. Examples of demulsifiers include phenol-formaldehyde resins; polyamines; di-epoxides; and polyols. Typically, when present, they comprise from about 1% to about 5% by weight of the surfactant composition.

When a dispersant is used as an additional component, the dispersant may, for example, be selected from polymaleic acids, polyacrylic acids and polyvinylsulphonic acids. Typically, when present, they comprise from about 1% to about 5% by weight of the surfactant composition.

When a biocide is used as an additional component, the biocide may, for example, be a quaternary ammonium or phosphonium compound, such as an ADBAC quaternary ammonium compound, or formaldehyde glutaraldehyde, or a C10-20 alkyl trimethyl or tetrakis (hydroxymethyl) phosphonium salt).

Coupling agents may be present as an optional component. When a coupling agent is used as an additional component, the agent may, for example, be selected from glycols (e.g. monoethylene glycol, propylene glycol or hexylene glycol), glycol ethers (such as ethylene glycol mono-n butyl ether) or esters (such as RHODISOLV POLARCLEAN from Solvay, which is methyl-5-dimethyl-amino-2-methyloxopentanoate). Typically, when present, they comprise from about 0.5% to about 20% by weight of the surfactant composition, e.g. from about 1 to 10 wt %.

The two surfactants may, in one embodiment, be used in combination in an environment that has a pH that is about neutral, e.g. having a pH of from about 6 to about 8, e.g. from about 6.5 to about 7.5.

It will be appreciated by the skilled reader that, unless stated to the contrary, all preferred features of any one of the aspects of the invention apply equally to the other aspects of the invention, mutatis mutandis.

All percentages in the specification are by weight, unless otherwise stated.

EXAMPLES

The invention will now be described by way of the following non-limiting examples.

Amphoteric surfactants were selected from the following:

TABLE 1

Amphoteric surfactants selected for the study

| Product | Chemistry | Active (%) |
|---|---|---|
| Mackam LSB-50 | Lauramidopropyl Hydroxysultaine. 95% lauric fatty acid cut | 40 |
| Mackterra LSB-50 ULS | Lauramidopropyl Hydroxysultaine with <0.5% NaCl | 40 |
| Mackam CBS-50G-E | Cocamidopropyl Hydroxysultaine | 40 |
| Mackam LMB | Lauramidopropyl Betaine. 70% lauric fatty acid cut | 30 |
| Miranol L32-E | Disodium Lauramphodiacetate | 30 |
| Mirataine H2-CHA | Disodium Lauraminodipropionate | 30 |
| Mackam 2CSF-40CG | Disodium Cocoamphodipropionate | 40 |
| Mackam JS | Caprylamphohydroxypropyl Sulfonate | 40 |

TABLE 1-continued

Amphoteric surfactants selected for the study

| Product | Chemistry | Active (%) |
|---|---|---|
| Mackam LS | Sodium Lauroamphohydroxylpropyl Sulfonate | 35 |
| Mackam CCAB-50 | Blend of Caprylamidopropyl Betaine and Capramidopropyl Betaine | 40 |
| Mackam MEJ | Blend of Caprylamphodiacetate and Caprylamphodipropionate | 30 |
| Mackam OIP-40 | Sodium Octyl Iminopropionate | 40 |

Mackam LSB-50 has no substitution warning according to the OSPARCOM guidelines for the use of chemicals in offshore environments. The surfactant was therefore selected as the primary surfactant for the foam tests.

Synergistic responses were investigated for mixtures of the surfactants according to the invention. The total active concentration was 1000 ppm and the ratios based on active content were 80/20, 60/40, 50/50, 40/60 and 20/80 respectively.

TABLE 2

Binary amphoteric surfactant mixtures that may be used in the invention

| First Surfactant | Second Surfactant |
|---|---|
| Lauramidopropyl Hydroxysultaine. 95% lauric fatty acid cut (Mackam LSB-50) | Caprylamphohydroxypropyl Sulfonate (Mackam JS) |
| Lauramidopropyl Hydroxysultaine with <0.5% NaCl (Mackterra LSB-50-ULS) | Sodium Octyl Iminopropionate (Mackam OIP-40) |
| Lauramidopropyl Hydroxysultaine. 95% lauric fatty acid cut (Mackam LSB-50) | Blend of Caprylamidopropyl Betaine and Capramidopropyl Betaine (Mackam CCAB-50) |
| Lauramidopropyl Hydroxysultaine. 95% lauric fatty acid cut (Mackam LSB-50) | Blend of Caprylamphodiacetate and Caprylamphodipropionate (Mackam MEJ) |
| Lauramidopropyl Hydroxysultaine. 95% lauric fatty acid cut (Mackam LSB-50) | Lauramidopropyl Betaine. 70% lauric fatty acid cut (Mackam LMB) |
| Lauramidopropyl Hydroxysultaine. 95% lauric fatty acid cut (Mackam LSB-50) | Disodium Lauramphodiacetate (Miranol L32-E) |
| Lauramidopropyl Hydroxysultaine. 95% lauric fatty acid cut (Mackam LSB-50) | Disodium Lauraminodipropionate (Mirataine H2-CHA) |
| Lauramidopropyl Hydroxysultaine with <0.5% NaCl (Mackterra LSB-50-ULS) | Disodium Lauraminodipropionate (Mirataine H2-CHA) |
| Lauramidopropyl Hydroxysultaine with <0.5% NaCl (Mackterra LSB-50-ULS) | Disodium Cocoamphodipropionate (Mackam 2CSF-40CG) |
| Lauramidopropyl Hydroxysultaine. 95% lauric fatty acid cut (Mackam LSB-50) | Sodium Lauroamphohydroxylpropyl Sulfonate (Mackam LS) |

It is noted that Mackterra LSB-50-ULS is a desalinated variant of lauramidopropyl hydroxysultaine (0.5% NaCl maximum) and was combined with 'salt-free' surfactants (imino and dipropionates) for liquid unloading experiments. Such surfactant combinations may be useful as foamer systems for low corrosion applications, e.g. capillary string injection.

Static foam tests were performed.

As is known in the art, static foam tests provide a rapid and relatively straightforward method to screen the foam performance of surfactants. The methods provide information on the stability and quality of the foam produced. Without being bound by theory, the mechanical properties of the foam lamellae and foam structure are determined to some extent by the packing of the surfactant molecules at the gas/liquid interface. In turn, the foam structure influences liquid drainage rates and therefore, the persistence or stability of the foam.

In order to perform static foam testing, 10% aqueous stock solutions of the surfactant compositions were prepared in distilled water. These were added to 10% w/w aqueous sodium chloride solution, such that the concentration of the surfactant in the brine was 1000 ppm.

Surfactant compositions according to the invention were benchmarked against the individual surfactants. A Waring type blender was used.

The flash foam volumes were measured by taking 200 ml of a surfactant composition according to the invention, subjecting it to high shear for 30 seconds at ambient temperature (20° C.) and then transferring the foam immediately to a measuring cylinder (1000 ml) for measurement. This initial volume was the flash volume. The foam and liquid volume was monitored for a further 10 minutes.

Static foam performance of the surfactants was assessed using key performance indicators described in US 2004121917 A1.

The 'half-life' of the foam was defined as the time taken for 100 ml of fluid to drain from the foam. Without being bound by theory, an increase in the half-life corresponds to a reduction in the liquid drainage rate and reflects the texture of the foam. Denser foams, as a rule, tend to take longer to drain and therefore are more persistent.

Results

In general, the use of a surfactant mixture containing a sultaine together with a propionate or a betaine gave improved results as compared to the single surfactant.

In contrast, the use of a surfactant mixture containing two sultaines did not give results that were better than each individual sultaine surfactant.

To illustrate the invention, static foam test data (for foam volume in ml at t=0), for 1000 pm active of surfactant mixture in a brine containing 10% w/w NaCl at 20° C. are given below.

| | Mackam LSB-50 = lauramidopropyl hydroxysultaine (%) | | | | | | |
|---|---|---|---|---|---|---|---|
| Surfactant | 0 | 20 | 40 | 50 | 60 | 80 | 100 |
| Mackam LMB = lauramidopropyl betaine. | 650 | 680 | 740 | 710 | 680 | 720 | 700 |
| Mackam JS = caprylamphohydroxy-propyl sulfonate (comparative example) | 300 | 500 | 530 | 580 | 600 | 580 | 700 |

In addition, static foam test data (for foam half life in seconds), for 1000 pm active of surfactant mixture in a brine containing 10% w/w NaCl at 20° C. are given below.

| | Mackam LSB-50 = lauramidopropyl hydroxysultaine (%) | | | | | | |
|---|---|---|---|---|---|---|---|
| Surfactant | 0 | 20 | 40 | 50 | 60 | 80 | 100 |
| Mirataine H2-CHA = disodium lauraminodipropionate | 194 | 270 | 295 | 246 | 260 | 237 | 240 |

Therefore it can be seen that improved foam characteristics can occur with the blends of the invention.

Dynamic foam tests were also performed.

A dynamic foam test apparatus based on the Bikerman test—described in R J Pugh, Handbook of Applied Surface and Colloid Chemistry, Volume 2, Eds K Holmberg, D O Shah, M J Schwager, J Wiley & Sons (2002), Chapter 8—was constructed to assess the liquid unloading properties of the mixed amphoteric surfactant compositions. The design was similar to equipment described in D T Nguyen, Petroleum Science & Technology, 2009, 27, 743. The apparatus was comprised of a jacketed glass column, the length and diameter could be varied, and a foam generator (fitted with a No 2 glass frit) attached to the base of the column. Nitrogen gas was fed through the generator and the flow rate adjusted using a flow meter to agitate the test solution. An overflow adapter and condenser attached to the top of the column permitted the liquid to be collected in a measuring cylinder (e.g. 1000 ml).

Liquid unloading experiments were carried out using 1000 ppm active surfactant and the following conditions:

Neutral pH and 10% w/w NaCl at 80° C.

A model condensate comprised of 80% v/v ISOPAR M (C9-15 iso-paraffins) and 20% v/v n-heptane.

The gas flow rate was 1.5 l/min and the brine/oil ratio was 50/50 v/v.

In general, the use of a surfactant mixture containing a sultaine together with a propionate or a betaine gave improved liquid unloading efficiency results as compared to the single surfactant. This reflects the beneficial technical effect of the invention.

To illustrate the invention, liquid unloading efficiency data (in %), for 1000 pm active of surfactant mixture in a 50/50 v/v brine/condensate (10% w/w NaCl; 80/20 ISOPAR M/n-heptane) at 80° C. are given in the table below.

| Surfactant | Mackam LSB-50 = lauramidopropyl hydroxysultaine (%) | | | | | | |
|---|---|---|---|---|---|---|---|
| | 0 | 20 | 40 | 50 | 60 | 80 | 100 |
| Mackam LMB = lauramidopropyl betaine | 58.3 | 65.3 | 64.4 | 62.3 | 62.2 | 64.5 | 53.5 |
| Mackam LS = Sodium lauroamphohydroxylpropyl sulfonate (comparative example) | 45.7 | 46 | 41.1 | 51 | 45.2 | 43.7 | 53.5 |

Similar results were also obtained when the lauramidopropyl hydroxysultaine (Mackam LSB-50) was replaced with cocamidopropyl hydroxysultaine (Mackam CBS-50G-E).

For the Mackam LSB-50 (lauramidopropyl hydroxysultaine)/Mackam LMB (lauramidopropyl betaine) blend, the experiment was also run to obtain liquid unloading efficiency data (in %), for 1000 pm active of surfactant mixture in a 20/80 v/v brine/condensate (10% w/w NaCl; 80/20 ISOPAR M/n-heptane) at 80° C. This mimics conditions where gas wells suffer from flooding with hydrocarbons.

The same synergistic effect was seen for the blend of the two surfactants. The liquid unloading results are illustrated in FIG. 1.

From left to right in that FIGURE, the columns show:
100% Mackam LMB (lauramidopropyl betaine)
80:20 Mackam LMB: Mackam LSB-50
40:60 Mackam LMB: Mackam LSB-50
100% Mackam LSB-50 (lauramidopropyl hydroxysultaine).

It can be seen that the blends showed improved performance as compared to the single surfactants, even when in the high percentage hydrocarbon environment.

Similar results to this were obtained when the lauramidopropyl hydroxysultaine (Mackam LSB-50) was replaced with cocamidopropyl hydroxysultaine (Mackam CBS-50G-E).

Liquid unloading efficiency data for 1000 pm active of surfactant mixture in a 50/50 v/v brine/condensate (10% w/w NaCl; 80/20 ISOPAR M/n-heptane) at 80° C. also showed synergy for other combinations of sultaine with either propionate or betaine, e.g. as set out below:—

The combination of Mackam LSB-50 (lauramidopropyl hydroxysultaine) with Miranol Ultra L32-E (disodium lauramphodiacetate) also showed synergy. For example, the liquid unloading efficiency for Mackam LSB-50 alone was 53.5%, for Miranol Ultra L32-E alone was 45.7%, but for a blend of 60% Mackam LSB-50 and 40% Miranol Ultra L32-E the liquid unloading efficiency was 66%.

The combination of Mackam LSB-50 (lauramidopropyl hydroxysultaine) with Mirataine H2-CHA (disodium lauraminodipropionate) also showed synergy. For example, the liquid unloading efficiency for Mackam LSB-50 alone was 53.5%, for Mirataine H2-CHA alone was 53.9%, but for a blend of 20% Mackam LSB-50 and 80% Mirataine H2-CHA the liquid unloading efficiency was 57.3%.

The combination of Mackam LSB-50 (lauramidopropyl hydroxysultaine) with Mackam 2CSF-40CG (disodium cocoamphodipropionate) also showed synergy. For example, the liquid unloading efficiency for Mackam LSB-50 alone was 53.5%, for Mackam 2CSF-40CG alone was 57.9%, but for a blend of 20% Mackam LSB-50 and 80% Mackam 2CSF-40CG the liquid unloading efficiency was 60%.

The combination of Mackam LSB-50 (lauramidopropyl hydroxysultaine) with Mackam CCAB-50 (blend of caprylamidopropyl betaine and capramidopropyl betaine) also showed synergy. For example, the liquid unloading efficiency for Mackam LSB-50 alone was 53.5%, for Mackam CCAB-50 alone was 21.8%, but for a blend of 90% Mackam LSB-50 and 10% Mackam CCAB-50 the liquid unloading efficiency was 55.8%.

By performing the static and dynamic foam tests, the inventors identified synergistic traits for the surfactant compositions according to the invention and demonstrated their suitability for use in liquid unloading from a hydrocarbon reservoir.

Without being bound by theory, it is believed that at neutral pH, betaines tend to have cationic characteristics compared to the sultaine, resulting in the synergistic response.

The tolerance to condensate was also improved by using the surfactant compositions according to the invention and therefore could be used to treat gas wells liable to flooding with hydrocarbons.

It was also found it was possible to improve the performance of C8-C22 propionate amphoteric surfactants with C8-C22 sultaine amphoteric surfactants. These types of formulation are advantageous because the use of a sultaine with a low salt content combined with a propionate permits the development of low corrosivity formulations.

Mixtures of hydroxysultaine and betaine exhibited the most improved performance, over a wide range of ratios (e.g. sultaine:betaine ratio of from 10:90 to 90:10 and especially from 20:80 to 80:20 and from 25:75 to 75:25). This was especially the case for combinations of hydroxysultaines and betaines having equivalent carbon chain lengths, e.g. where both were C12 or both were C10.

The surfactant blends also showed good tolerance to increased levels of condensate (hydrocarbon) and therefore could be used to treat gas wells liable to flooding with hydrocarbons.

Mixtures of hydroxysultaine and propionate also gave good results. The best results for such combinations were for ratios of sultaine:propionate from 10:90 to 40:60, especially from 20:80 to 30:70. These types of formulation are advantageous because the use of a sultaine with a low salt content combined with a propionate permits the development of low corrosivity formulations for continuous injection applications.

FURTHER EXAMPLES

Example 1

Dynamic Foam Test—Liquid Unloading

A dynamic foam test apparatus—based on the Bikerman test (R J Pugh, Handbook of Applied Surface and Colloid Chemistry, Volume 2, Eds K Holmberg, D O Shah, M J Schwager, J Wiley & Sons (2002), Chapter 8)—was constructed to assess the liquid unloading properties of the mixed amphoteric surfactant compositions. The design was similar to equipment described in literature (D T Nguyen, Petroleum Science & Technology, 2009, 27, 743). The apparatus comprised a jacketed glass column (the length and diameter could be varied) and a foam generator (fitted with a No 2 glass frit) attached to the base of the column.

Nitrogen gas was fed through the generator and the flow rate adjusted using a flow meter to agitate the test solution. An overflow adapter and condenser attached to the top of the column permitted the liquid to be collected in a measuring cylinder (e.g. 1000 ml). Furthermore, the apparatus could be dismantled after use for cleaning.

Liquid unloading experiments were carried out using 1000 ppm active surfactant(s) and the following conditions:
  Neutral pH and 10% w/w or 20% w/w NaCl respectively at 80° C.
  A model condensate comprised of ISOPAR M (C9-15 iso-paraffins).
  The gas flow rate was 0.5-1.0 l/min and the brine/oil ratio was 50/50 v/v.
  Brine/condensate ratio: the condensate loading was increased to 80% v/v and the liquid unloading performance for systems exhibiting synergistic patterns in the previous set of experiments was evaluated.

10% active aqueous solutions of the surfactants were prepared for the tests. The solutions permitted blending together in different ratios with surfactant typically used in foamer applications in order to assess the synergistic attributes of the mixtures. The solutions (2.6 g—equivalent to 1000 ppm active surfactant) were added dropwise through the top of the apparatus into the brine and hydrocarbon mixture (260 ml).

The brine and hydrocarbon was allowed to equilibrate at the appropriate temperature, of about 80° C., before the surfactant was added. The gas was injected through the base of the column (about 1.0 l/min) and the foam generated was allowed to overflow from the column into a clean, pre-weighed 1000 ml measuring cylinder for 15 minutes.

The measuring cylinder permitted the measurement of the foam volume and the respective amounts of brine and hydrocarbon recovered from the column. When the test had been completed, the gas flow was turned off and the measuring cylinder was weighed. The apparatus was cleaned before repeating the test with additional surfactant blends.

Liquid unloading efficiencies of the foamer systems were calculated using the following expression:

$$\text{Liquid unloading (\%)} = \frac{\text{Weight of fluid recovered}}{\text{Total weight of fluid (brine + hydrocarbon)}} \times 100$$

The liquid unloading efficiencies of surfactant compositions comprising MACKAM LSB-50 (lauramidopropyl hydroxysultaine) and MIRATAINE H2-CHA (disodium lauramino dipropionate) were determined. The total active surfactant concentration was 1000 ppm. The gas flow rate was 1.0 l/min. The temperature was 80° C.

The brine used was a brine/hydrocarbon mixture. The first brine tested comprised 10/90 v/v 10% w/w NaCl and 90% ISOPAR M. The results are given in the following table:

| | MACKAM LSB-50 concentration | | | | | | |
|---|---|---|---|---|---|---|---|
| | 0% | 20% | 40% | 50% | 60% | 80% | 100% |
| | MIRATAINE H2-CHA concentration | | | | | | |
| | 100% | 80% | 60% | 50% | 40% | 20% | 0% |
| Liquid Unloading Efficiency (%) | 89.3 | 89.6 | 91.3 | 92.2 | 92.5 | 90.6 | 55.1 |

It can be seen that synergistically beneficial effects are achieved when the two surfactants are used in combination, when compared to either (i) just the lauramidopropyl hydroxysultaine being used on its own (i.e. MACKAM LSB-50 concentration=100%) or (ii) just the disodium lauramino dipropionate being used on its own (i.e. MACKAM LSB-50 concentration=0%).

The synergistic effect is seen over a range of ratios of first surfactant: second surfactant.

The synergistic effect is clearly seen with from 20% to 80% lauramidopropyl hydroxysultaine, with the balance being disodium lauramino dipropionate, i.e. with ratios of from 1:4 to 4:1 of first surfactant: second surfactant.

Particularly improved synergistic results are seen with from 40% to 80% lauramidopropyl hydroxysultaine, with the balance being disodium lauramino dipropionate, i.e. with ratios of from 2:3 to 4:1 of first surfactant: second surfactant.

The most dramatic synergistic results are seen with from 40% to 60% lauramidopropyl hydroxysultaine, with the balance being disodium lauramino dipropionate, i.e. with ratios of from 2:3 to 3:2 of first surfactant: second surfactant.

Surfactant Concentrations

Liquid unloading efficiencies can also be achieved at other total active surfactant concentrations, e.g. 250 ppm, 500 ppm and 750 ppm, with synergistically beneficial effects being achieved when the two surfactants are used in combination to make up that total active surfactant concentration rather than just the sultaine surfactant (such as lauramidopropyl hydroxysultaine) being used on its own or just the betaine or propionate surfactant (such as disodium lauramino dipropionate) being used on its own.

Alternative Surfactant Combinations

The same synergistic effect, over a range of surfactant ratios, as illustrated above was also seen when the lauramidopropyl hydroxysultaine (Mackam LSB-50) was replaced with cocamidopropyl hydroxysultaine (Mackam CBS-50G-E).

Further, similar synergistically beneficial effects may be achieved when other similar combinations of two surfactants are used, e.g. combinations of two surfactants when the sultaine surfactant is selected from:
Lauramidopropyl hydroxysultaine
Cocamidopropyl hydroxysultaine and when the betaine or propionate surfactant is selected from:
Lauramidopropyl betaine
Disodium lauramphodiacetate
Disodium lauraminodipropionate
Disodium cocoamphodipropionate
Blends of caprylamidopropyl betaine and capramidopropyl betaine
Blends of caprylamphodiacetate and caprylamphodipropionate
Sodium octyl iminopropionate.

Alternative Brine Formulations

Similar synergistically beneficial effects may be achieved when the surfactant compositions are tested in other brine formulations.

In general, when further brines, which were brine/hydrocarbon mixtures, were used in the above tests those with an increased loading of hydrocarbon showed the best results.

However, the present invention is such that effective liquid unloading efficiencies can still be achieved with brines having high levels of dissolved electrolytes, e.g. 5% w/w or more, or 10% w/w or more, such as up to 20% w/w, of dissolved electrolytes (such as NaCl).

CONCLUSION

Synergistic effects in terms of liquid unloading efficiencies are achieved by using a combination of a C8-22 sultaine surfactant (such as lauramidopropyl hydroxysultaine) together with C8-22 betaine or propionate surfactant (such as disodium lauramino dipropionate).

It will be appreciated by those skilled in the art that the foregoing is a description of a preferred embodiment of the present invention and that variations in design and construction may be made to the preferred embodiment without departing from the scope of the invention as defined by the appended claims.

The invention claimed is:

1. A method of unloading liquid from a reservoir, the method comprising: introducing a first and a second amphoteric surfactant into a liquid in the reservoir, in order to foam the liquid; and then removing foamed liquid from the reservoir;
wherein the first amphoteric surfactant is a C8-C22 sultaine selected from the group consisting of alkyl hydroxysultaines, alkylamidopropyl hydroxysultaines, alkyl amphohydroxypropylsulfonates, salts thereof, and combinations thereof; and the second amphoteric surfactant is selected from the group consisting of C8-C22 betaines and salts thereof, C8-C22 propionates and salts thereof, and mixtures thereof.

2. The method of claim 1, wherein the reservoir is a hydrocarbon reservoir.

3. The method of claim 2, wherein the hydrocarbon reservoir is an oil or gas reservoir.

4. The method of claim 1, wherein the amphoteric surfactants are used in the reservoir at a total active surfactant concentration of:
(a) 100 ppm or more; or
(b) 150 ppm or more; or
(c) 250 ppm or more; or
(d) 500 ppm or more; or
(e) from 150 ppm to 10,000 ppm; or
(f) from 200 ppm to 5,000 ppm.

5. The method according to claim 1, wherein the first surfactant is selected from the group consisting of:
Lauramidopropyl hydroxysultaine,
Cocamidopropyl hydroxysultaine,
Caprylamphohydroxypropyl sulfonate,
Sodium lauroamphohydroxylpropyl sulfonate,
salts thereof, and mixtures thereof.

6. The method according to claim 5, wherein the first surfactant is selected from the group consisting of:
Lauramidopropyl hydroxysultaine,
Cocamidopropyl hydroxysultaine,
salts thereof, and mixtures thereof.

7. The method of claim 1, wherein the second amphoteric surfactant is selected from the group consisting of C8-C22 betaines and salts thereof.

8. The method according to claim 7, wherein the second amphoteric surfactant is selected from the group consisting of alkyl dimethylbetaines, alkylamidopropyl betaines, alkylampho(di)acetates, salts thereof, and combinations thereof.

9. The method according to claim 8, wherein the second amphoteric surfactant is selected from the group consisting of:
Lauramidopropyl betaine,
Cocoamidopropyl betaine,
Disodium lauramphodiacetate,
Blends of caprylamidopropyl betaine and capramidopropyl betaine,
C12/C14 alkyl dimethyl betaine,
salts thereof, and mixtures thereof.

10. The method according to claim 9, wherein the second amphoteric surfactant is selected from the group consisting of:
Lauramidopropyl betaine,
Cocoamidopropyl betaine,
Blends of caprylamidopropyl betaine and capramidopropyl betaine,
C12/C14 alkyl dimethyl betaine,
salts thereof, and mixtures thereof.

11. The method of claim 7, wherein the sultaine:betaine ratio is from 10:90 to 90:10.

12. The method of claim 11, wherein the sultaine:betaine ratio is from 20:80 to 80:20.

13. The method of claim 12, wherein the sultaine:betaine ratio is from 25:75 to 75:25.

14. The method of claim 7, wherein the sultaine and the betaine have the same carbon chain length.

15. The method of claim 14, wherein the sultaine is a C10 sultaine and the betaine is a C10 betaine.

16. The method of claim 14, wherein the sultaine is a C12 sultaine and the betaine is a C12 betaine.

17. The method of claim 14, wherein the sultaine is a C14 sultaine and the betaine is a C14 betaine.

18. A method of unloading liquid from a reservoir, the method comprising: introducing a first and a second amphoteric surfactant into a liquid in the reservoir, in order to foam the liquid; and then removing foamed liquid from the reservoir;

wherein the first amphoteric surfactant is a C8-C22 sultaine selected from the group consisting of alkyl hydroxysultaines, alkylamidopropyl hydroxysultaines, alkyl amphohydroxypropylsulfonates, salts thereof, and combinations thereof; and the second amphoteric surfactant is selected from the group consisting of C8-C22 betaines and salts thereof.

* * * * *